C. J. BARDON.
MUD DOG.
APPLICATION FILED DEC. 15, 1919.
1,335,546.
Patented Mar. 30, 1920.
2 SHEETS—SHEET 1.
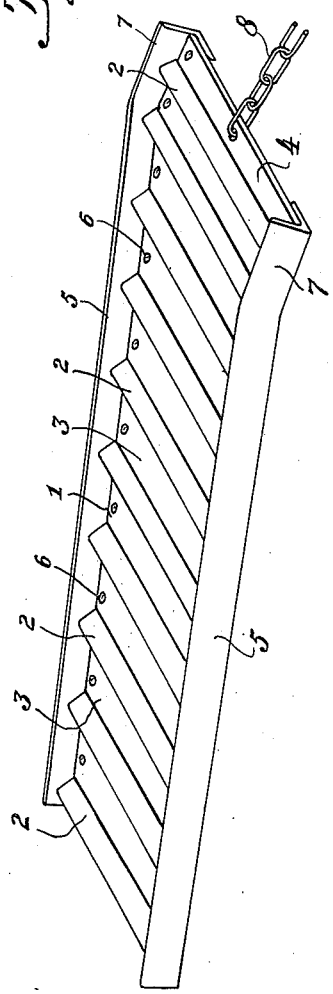
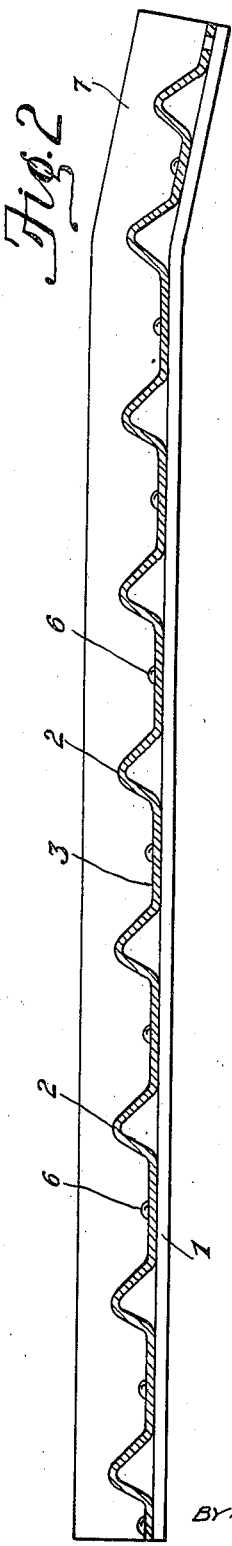
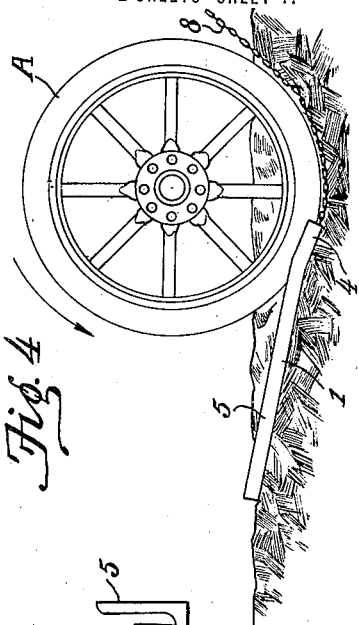
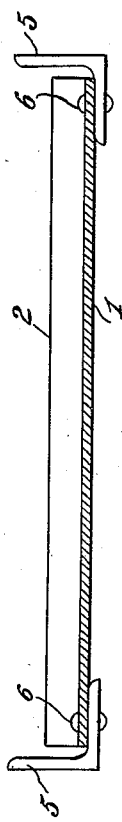
INVENTOR
Claud J. Bardon
BY: Frease, Merkel, Caywell & Bond
ATTYS.

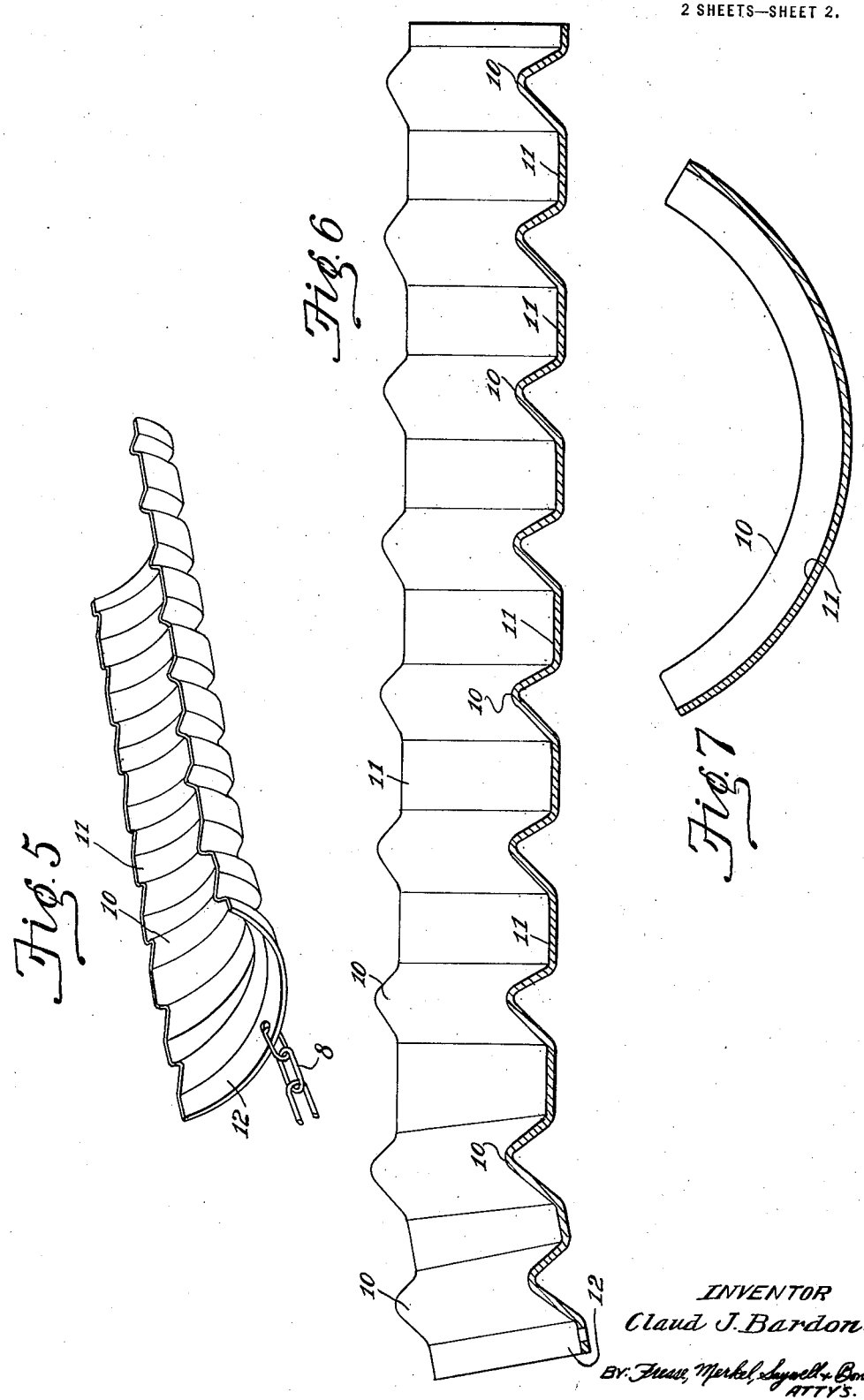

UNITED STATES PATENT OFFICE.

CLAUD J. BARDON, OF GRANTS PASS, OREGON, ASSIGNOR TO THE UNION METAL MANUFACTURING COMPANY, OF CANTON, OHIO, A CORPORATION OF OHIO.

MUD-DOG.

1,335,546.  Specification of Letters Patent.  Patented Mar. 30, 1920.

Application filed June 24, 1915. Serial No. 36,006.

*To all whom it may concern:*

Be it known that I, CLAUD J. BARDON, a citizen of the United States, residing at Grants Pass, in the county of Josephine and State of Oregon, have invented a new and useful Mud-Dog, of which the following is a specification.

This invention relates to mud dogs and has more especial reference to a corrugated sheet metal mud dog designed to be used upon motor vehicles, such as trucks and the like.

The objects of the invention are to provide a sheet metal mud dog provided with transverse corrugations longitudinally strengthened and provided with a downturned end arranged to be inserted beneath the wheel of a truck or other vehicle in order to provide a tread surface for engagement with the wheel to assist in extricating the wheel from a rut or hole in the road.

With these objects in view the invention consists in the novel construction and arrangement of parts, hereinafter described, illustrated in the accompanying drawings, and particularly pointed out in the appended claims, it being understood that various changes in the form, proportions, size and minor details of construction may be made within the scope of the appended claims, without departing from the spirit or sacrificing any of the advantages of the invention.

The invention thus set forth in general terms is illustrated in the accompanying drawings forming part hereof, in which:—

Figure 1 is a perspective view of the mud dog embodying the invention.

Fig. 2 is a longitudinal sectional view through the same.

Fig. 3 is a transverse sectional view through the same.

Fig. 4 shows the application of the mud dog.

Fig. 5 is a perspective view of a slightly different form of the device.

Fig. 6 is a longitudinal sectional view through the form of device shown in Fig. 5.

Fig. 7 is a transverse sectional view through the same.

A practical embodiment of the invention is disclosed in the accompanying drawings, forming a part of this specification in which similar numerals of reference indicate corresponding parts throughout the several views.

Referring more especially to the construction illustrated in Figs. 1 to 4 inclusive, the mud dog comprises a metal sheet 1, provided at intervals with the upwardly pressed ribs 2, the flat portions 3 thus produced between the ribs being preferably of greater width than the width of the ribs, thus providing a corrugated tread surface for the wheel similar to the "corduroy road."

The rear end of the device is inclined downwardly as shown at 4 for the purpose of inserting this end beneath the wheel as shown in Fig. 4. A transverse rib 2 is preferably located upon the inclined portion 4 near the rear end of the device in order to provide a suitable tread for the wheel at the rear end of the mud dog.

For the purpose of bracing the device longitudinally angle irons 5 are provided along each side edge of the body portion 1, these angle irons preferably extending beneath the edge portions of the body of the sheet rivets 6 or their equivalents being provided for connecting the sheet to the angle irons, the angle irons are necessarily bent downwardly at their rear ends as shown at 7 to accommodate the inclined portion 4 of the sheet.

For the purpose of attaching the mud dog to the vehicle a chain 8 or the like is connected to the rear end of the mud dog and connected to some portion of the vehicle. By thus connecting the mud dog to the truck the mud dog will be dragged along the road by the truck after it has been used to extricate a wheel from the mud, it thus not being necessary to stop the truck and remove the mud dog after each time it is used.

The operation of the device is clearly illustrated in Fig. 4; the wheel A being shown embedded in a mud hole in the road. The mud dog is placed in the position shown in this figure, the inclined end 4 thereof being located beneath the forward side of the wheel. When the wheel is rotated in the direction of the arrow it will be seen that the tread of the wheel will grip the tread surface of the mud dog formed by the alternate transverse ribs 2 and intervening flat portions 3, the wheel traveling up over the length of the mud dog out of the depression in the road and on to the surface of the road and as the vehicle continues to move in this direction the wheel will pass beyond the mud dog which will be moved along the road after the vehicle by means of the chain 8.

Attention is now directed to the construction illustrated in Figs. 5 to 7 inclusive in which is provided a form of the device especially adaptable for pneumatic tires where the tread surface of the tire is considerably curved in cross section. The body portion of the mud dog is curved transversely as best shown in Fig. 7 and is provided at intervals with the transverse curved inwardly disposed ribs or corrugations 10 and with the intervening flat portions 11. The rear end of the device is inclined downwardly as shown at 12 and it will be noted that a rib 10 is provided near the rear end of the inclined portion.

It should be noted that in this form of the device no angle irons or other reinforcing members are necessary for strengthening the structure longitudinally, the transverse curve of the entire structure will strengthen the device longitudinally, the corrugations or ribs 10 reinforcing the device transversely as well as providing a suitable tread surface for the wheel. This form of the device as well as the other is provided with a chain 8 for securing some portion of the device to the vehicle.

Although the drawings and above specification disclose the best mode in which I have contemplated embodying my invention I desire to be not limited to the details of such disclosure, for, in the further practical application of my invention, many changes in form and construction may be made, as circumstances require or experience suggests, without departing from the spirit of the invention, within the scope of the appended claims.

I claim:

1. A mud dog comprising a body portion, spaced transverse ribs upon its upper face, the rear end of said body portion being downwardly inclined.

2. A mud dog comprising a metal sheet having upwardly pressed transverse spaced ribs formed therein, the rear end of said mud dog being downwardly disposed.

3. A mud dog formed of sheet metal provided with spaced upwardly pressed ribs and intervening flat portions.

4. A mud dog formed of sheet metal provided with spaced upwardly pressed ribs and intervening flat portions of greater width than the ribs.

5. A mud dog formed of sheet metal provided with spaced transverse upwardly pressed ribs and intervening flat portions, the rear end thereof being downwardly inclined.

6. A mud dog formed of sheet metal provided with spaced upwardly pressed transverse ribs and longitudinal reinforcing means.

7. A mud dog formed of sheet metal transversely curved and provided with spaced upwardly pressed ribs, and intervening flat portions.

8. A mud dog formed of sheet metal transversely curved and provided with spaced upwardly pressed ribs and intervening flat portions of greater width than the ribs.

9. A mud dog formed of sheet metal transversely curved and provided with spaced upwardly pressed ribs and intervening flat portions, the rear end thereof being downwardly inclined.

10. A mud dog formed of sheet metal transversely curved and provided with spaced upwardly pressed ribs and intervening flat portions of greater width than the ribs, the rear end thereof being downwardly inclined.

In testimony that I claim the above I have hereunto subscribed my name.

CLAUD J. BARDON.